Patented Dec. 13, 1927.

1,652,811

UNITED STATES PATENT OFFICE.

DONALD B. BRADNER, OF WILMINGTON, DELAWARE, ASSIGNOR TO E. I. DU PONT DE NEMOURS & COMPANY, OF WILMINGTON, DELAWARE, A CORPORATION OF DELAWARE.

IMPREGNATED WOOD AND METHOD OF EFFECTING THE IMPREGNATION.

No Drawing. Application filed November 19, 1925. Serial No. 70,187.

This invention relates to a process and a liquid for treating wood to effect its preservation and to the resulting product. More particularly, it is concerned with the impregnation of wood with a solution of a toxic material in molten sulphur.

The object of the invention is to provide a process and a liquid adapted to perpetually protect wood against the attacks of animal and vegetable life, and to also render it water and weather proof.

Another object of the invention is to permanently increase the strength of the wood.

The destruction of marine piling by toredo, limnoria and other marine borers has long been recognized as a serious problem. Numerous attempts have been made in the past to protect piling by impregnating the timber with various toxic substances, but while this treatment gives excellent protection at the start, the toxic substance is leached out within a few years and then the timber is attacked. When the toxic substance is dissolved in some difficultly soluble liquid such as petroleum or creosote, the life of the piling is considerably increased, but even in this case the toxic ingredient will in time be leached out.

I have now found that it is possible to dissolve many toxic materials in molten sulphur and to use these solutions as impregnating agents for wood. More or less of the toxicant, in most cases, crystallizes out in finely divided particles as the sulphur cools, but these crystals of toxicant are entirely surrounded by solid sulphur and consequently will remain almost indefinitely in wood under water without being leached out. When the timber is attacked by marine borers the toxicant is exposed and kills the borer.

The presence of the sulphur, in addition to preventing the leaching out of the toxic substance, also serves to render the wood water resistant. Moreover, it has been found that the strength of wood is increased by the absorption of the molten sulphur.

The example furnished below discloses in detail a preferred application of our process. It is to be understood, of course, that it is merely an illustration, and that the details therein specified, as proportions, temperatures, etc., may be varied within the scope of the claims.

Example: Approximately 2% of arsenic sulphide is heated with 98% sulphur to a temperature of approximately 130°–140° C., at which temperature the melt is a mobile liquid. The wood is then impregnated with this liquid, for example, by the ordinary vacuum and pressure process for wood impregnation, maintaining the temperature at approximately 130° C. during this operation. After the desired degree of impregnation has been obtained the excess liquid is removed and, after cooling, a product is obtained which is both stronger and more resistant to abrasion than the original wood and which will remain unattacked by marine borers for an indefinite period.

A number of toxic materials may be substituted for the arsenic sulphide, the only limitation to their use being that they must be sufficiently soluble in molten sulphur and sufficiently toxic to be effective. Arsenic disulphide dissolves to the extent of 3.3% in sulphur at 140° C.; 4.7% arsenic pentasulphide dissolves in sulphur at 140° C. The product obtained by heating arsenious oxide with sulphur (probably arsenic pentasulphide) has approximately this same solubility. Selenium is soluble to the extent of 1.9% at 140° C., phosphorus pentasulphide is soluble to the extent of 1.2% at 140° C., potassium sulphide has a solubility of 1.0%. A wide variety of organic compounds are somewhat soluble in molten sulphur, and many of these are extremely toxic. The sulphur soluble organic arsenic compounds are excellent examples of such materials which are adapted for our purpose.

Although in the example the well known vacuum and pressure process for wood impregnation is mentioned, the particular manner of effecting impregnation is no part of my invention. The impregnation may be performed by any of the well known methods.

While the primary purpose in using the new liquid for wood impregnation is the protection of marine structures, it is realized that its application to almost any wood preservation problem such as railroad ties, fence posts, telegraph poles, building timber (particularly for use in the tropics) etc., is entirely practical and that it has the advantage of low cost as well as the strengthening of the timber, over creosote and similar materials now extensively used.

By reason of the peculiar method of my invention which comprises the use of the molten sulphur as a vehicle for the toxic substance, the particles of the latter upon cooling are encased in a protecting coating of sulphur and a permanency of impregnation is obtained which can be effected in no other manner.

I claim:

1. A process of impregnating wood with a solid toxic substance which comprises employing molten sulphur as a vehicle for said substance.

2. A process of treating wood which comprises dissolving a toxic sulphide in molten sulphur and impregnating the wood with said solution.

3. A process of treating wood which comprises dissolving a sulphide of arsenic in molten sulphur and impregnating the wood with said solution.

4. A process of treating wood which comprises dissolving arsenic pentasulphide in molten sulphur and impregnating the wood with said solution.

5. A liquid adapted for preserving wood comprising a solution of a normally solid toxicant in molten sulphur.

6. A liquid adapted for preserving wood comprising a solution of a sulphur-soluble salt of arsenic in molten sulphur.

7. A liquid adapted for preserving wood comprising a solution of a sulphur-soluble, toxic sulphide in molten sulphur.

8. Wood containing within its pores a finely divided solid toxicant, the particles of which are enclosed in solid sulphur.

9. Wood having in the interstices thereof a solid toxicant which is wholly protected from exposure to moisture by solid sulphur.

10. Wood impregnated with solid sulphur and a sulphur-soluble salt of arsenic.

11. Wood impregnated with solid sulphur and a sulphur-soluble organic toxicant.

In testimony whereof I affix my signature.

DONALD B. BRADNER.